No. 852,527. PATENTED MAY 7, 1907.
W. H. SAUVAGE.
FLUID PRESSURE BRAKE.
APPLICATION FILED NOV. 21, 1906.
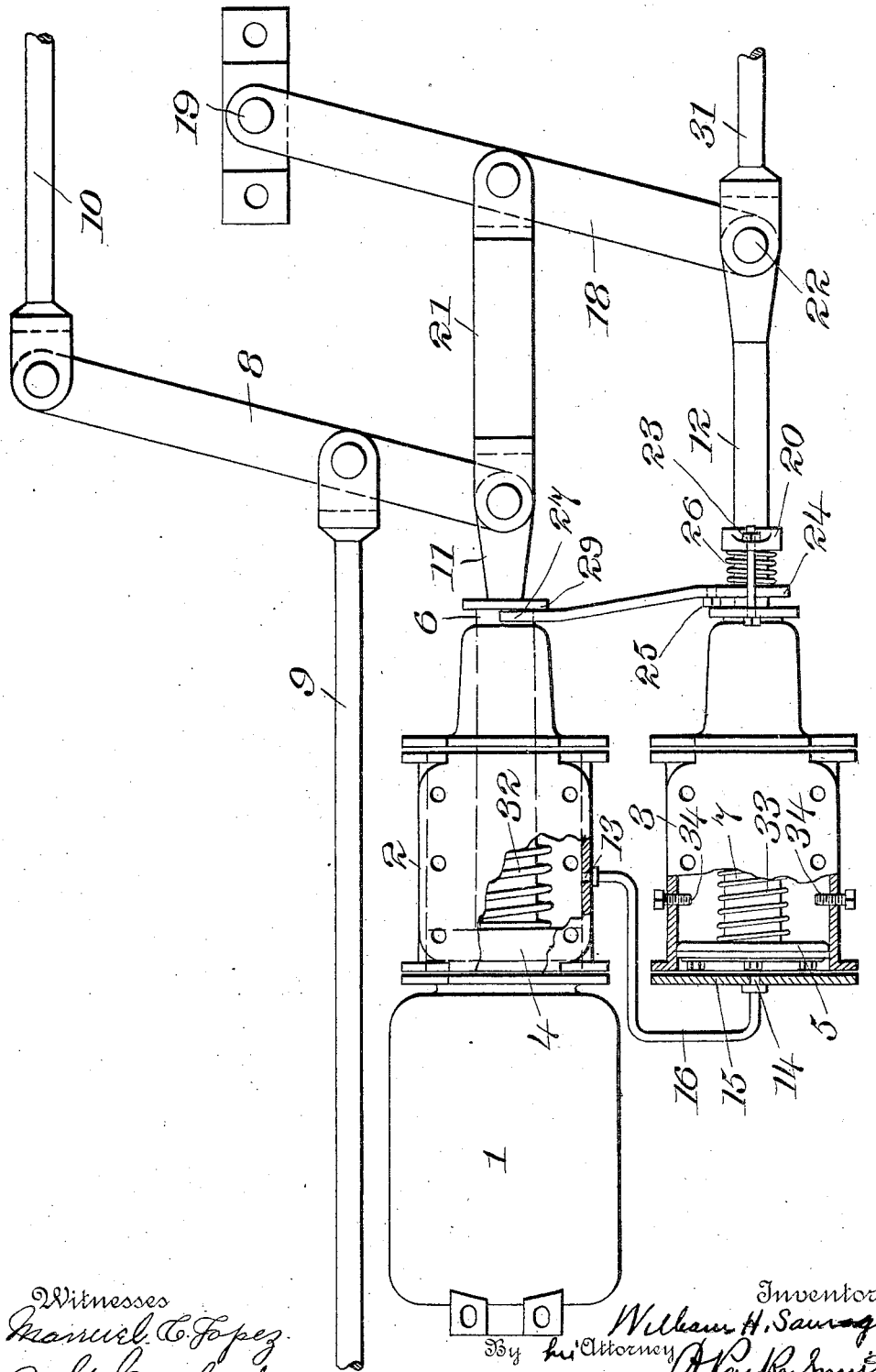
Witnesses
Manuel C. Lopez
M. G. Crawford
Inventor
William H. Sauvage
By his Attorney
H. Parker Smith

UNITED STATES PATENT OFFICE.

WILLIAM H. SAUVAGE, OF NEW YORK, N. Y., ASSIGNOR TO SAUVAGE SAFETY BRAKE COMPANY, A CORPORATION OF NEW JERSEY.

FLUID-PRESSURE BRAKE.

No. 852,527.  Specification of Letters Patent.  Patented May 7, 1907.

Application filed November 21, 1906. Serial No. 344,439.

*To all whom it may concern:*

Be it known that I, WILLIAM H. SAUVAGE, a citizen of the United States of America, and a resident of the borough of Manhattan, city, county, and State of New York, have invented certain new and useful Improvements in Fluid-Pressure Brakes, of which the following is a specification.

The invention disclosed comprises certain improvements on that shown in my reissued Letters Patent No. 12,229 dated June 7th, 1904.

The best form of apparatus embodying my invention at present known to me is illustrated in the accompanying drawing which shows a plan view of a portion of the usual freight car brake apparatus with my invention applied thereto, parts being broken away and the brakes shown in release position.

Throughout the drawing, like reference figures indicate like parts.

1 is the auxiliary reservoir, 2 the usual cylinder having piston 4, hollow piston rod 6, push rod 11 and spring 32. One brake lever 8 is shown with a portion of tie rod 9 and of one top rod 10.

3 is a second or auxiliary cylinder having piston 5, hollow piston rod 7, spring 33 and push rod 12.

13 is a port in the side wall of cylinder 2 and so located as to be uncovered by piston 4 when it has traveled about 5½ inches.

14 is a port in the pressure head 15 of cylinder 3, connected to port 13 by pipe 16.

18 is a lever pivoted to a fixed fulcrum 19 on the car body at one end and at the other end to the push rod 12 by pin 22. The link 21 connects lever 18 with the brake rigging. A friction clutch composed of the clutch dog 24 perforated for the passage of the push rod 12 and having the fulcrum projection 25 is held in position by spiral spring 26 mounted on rod 12 and compressed between the dog and the yoke 20 connected to the hollow piston by bolts 23. This forms a gripping device connecting the second piston to the brake rigging.

27 is the outer end or tail of the clutch dog 24 which is engaged by the collar 29 on piston 4. To prevent the parts being jammed in case the clutch 24 should slip and allow the second piston to have enough travel to cause the extension 27 of dog 24 to overtake and strike the collar 29 on the out stroke, I employ some suitable stop for the piston. Bolts, 34, 34 inserted through the walls of the second cylinder will serve for the purpose or any other device that blocks the second piston after it has traveled a predetermined distance, say 6 inches.

The rod 31 may extend to the hand brake apparatus.

In operation the first cylinder and brake rigging operate in the usual manner. The push rod 12 moves freely through the clutch on the out stroke of the first piston 4. When piston 4 passes port 13, air passes through pipe 16 to cylinder 3 and forces piston 5 out. This piston being connected to the brake rigging through push rod 12, lever 18, link 21 and clutch dog 24 as soon as the collar 29 of piston 4 moves away from the extension 27 of dog 24, adds its force with double effect to the tension of the brake rigging. When the air is exhausted from the cylinders, piston 5 first comes home. The brakes are held in the position then assumed until piston 4 goes home when its collar 29 strikes the tail 27 of dog 24 and trips the clutch permitting the push rods also to come home and release the brakes. I find this slightly delayed final release an advantage on long trains as it tends to permit the cars to adjust themselves relative to one another before the brakes are completely released and so avoid breaking the train in two when releasing long trains at slow speeds.

The apparatus disclosed is particularly advantageous in its action in applying brakes in that the first cylinder applies the brakes quickly but without great force as the air is bled off into the second cylinder. The latter puts on the maximum brake pressure after a delay of a fraction of a second, thus avoiding the heavy blow of the ordinary single cylinder application. Also in case of much slack existing in the brake rigging as through wear of the brake shoes, the first piston goes nearly to the limit of its travel before sufficient air gets into the second cylinder to start the second piston into action. The result is that the travel of the second piston rarely exceeds 3½ inches even though the first piston goes the whole length of its cylinder which gives it a travel of 12 inches.

Of course other forms of gripping devices or clutches could be used and other arrangements of levers, and the tripping connection for the clutch might be differently constructed.

Having, therefore, described my invention, I claim:

1. In a fluid pressure brake apparatus, the combination with the usual cylinder, piston having a hollow piston rod, brake rigging and push rod connected thereto, of a second cylinder, piston with hollow piston rod and push rod also connected to the brake rigging, a gripping device mounted on the second piston rod and normally preventing the movement of the second push rod into the hollow piston rod but permitting it to be withdrawn therefrom, and means for tripping said gripping device actuated by the first piston.

2. In a fluid pressure brake apparatus, the combination with the usual cylinder, piston having a hollow piston rod, brake rigging and push rod connected thereto, of a second cylinder, piston with hollow piston rod and push rod also connected to the brake rigging, a gripping device mounted on the second piston rod and normally preventing the movement of the second push rod into the hollow piston rod but permitting it to be withdrawn therefrom, and means for tripping said gripping device actuated by the first piston, said gripping device comprising a perforated friction dog encircling the second push rod, fulcrumed on the second piston and having an extension engaged by the first piston.

3. In a fluid pressure brake apparatus, the combination with the usual cylinder, piston having a hollow piston rod, brake rigging and push rod connected thereto, of a second cylinder, piston with hollow piston rod and push rod also connected to the brake rigging, a gripping device mounted on the second piston rod and normally preventing the movement of the second push rod into the hollow piston rod but permitting it to be withdrawn therefrom, and means for tripping said gripping device actuated by the first piston, said gripping device comprising a perforated friction dog encircling the second push rod, fulcrumed on the second piston and having an extension engaged by the first piston, together with a yoke carried by said second piston and a spiral spring surrounding the push rod and confined between the yoke and the clutch dog.

4. In a fluid pressure brake apparatus, the usual cylinder, piston having a hollow piston rod, brake rigging and push rod connected thereto, the push rod telescoping into the hollow piston rod, in combination with a second cylinder, piston with hollow piston rod and push rod telescoping therein and also connected to the brake rigging by a system of levers, means actuated by the movement of the first piston admitting air to the second cylinder, a clutch mounted on the second piston rod, and engaging the second push rod, and means for tripping said clutch operated by the first piston.

5. In a fluid pressure brake apparatus, the usual cylinder, piston having a hollow piston rod, brake rigging and push rod connected thereto, the push rod telescoping into the hollow piston rod, in combination with a second cylinder, piston with hollow piston rod and push rod telescoping therein and also connected to the brake rigging by a system of levers, means actuated by the movement of the first piston admitting air to the second cylinder, a clutch mounted on the second piston rod, and engaging the second push rod, and means for tripping said clutch operated by the first piston, said means comprising an extension of the clutch dog engaged by a projection on the first hollow piston rod.

6. In a fluid pressure brake apparatus, the combination with the usual cylinder, piston having a hollow piston rod, brake rigging and push rod connected thereto, of a second cylinder, piston with hollow piston rod and push rod also connected to the brake rigging, a gripping device mounted on the second piston rod and normally preventing the movement of the second push rod into the hollow piston rod, but permitting it to be withdrawn therefrom, and means for tripping said gripping device actuated by the first piston, together with means for limiting the outward stroke of the second piston at a point beyond which a reëngagement between the gripping and tripping devices might occur.

7. In a fluid pressure brake apparatus, the combination with the usual cylinder, piston having a hollow piston rod, brake rigging and push rod connected thereto, of a second cylinder, piston with hollow piston rod and push rod also connected to the brake rigging, a gripping device mounted on the second piston rod and normally preventing the movement of the second push rod into the hollow piston rod but permitting it to be withdrawn therefrom, and means for tripping said gripping device actuated by the first piston, said gripping device comprising a perforated friction dog encircling the second push rod, fulcrumed on the second piston and having an extension engaged by the first piston, together with a stop limiting the movement of the second piston.

Signed at New York, N. Y. this 19th day of November, 1906.

WILLIAM H. SAUVAGE.

Witnesses:
A. PARKER-SMITH,
M. G. CRAWFORD.